United States Patent
Hassan et al.

(10) Patent No.: US 7,544,928 B2
(45) Date of Patent: Jun. 9, 2009

(54) HIGH RESOLUTION GAMMA MEASUREMENTS AND IMAGING

(75) Inventors: Gamal A. Hassan, Houston, TX (US);
William Madigan, Houston, TX (US);
Gavin Lindsay, Kuala Lumpur (MY);
Phil L. Kurkoski, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/873,556

(22) Filed: Oct. 17, 2007

(65) Prior Publication Data

US 2009/0101808 A1    Apr. 23, 2009

(51) Int. Cl.
*G01V 1/00*    (2006.01)
(52) U.S. Cl. ....................... 250/265; 250/366
(58) Field of Classification Search ................. 250/366, 250/265
See application file for complete search history.

(56) References Cited

U.S. PATENT DOCUMENTS

| | | | | |
|---|---|---|---|---|
| 2,920,204 | A | * | 1/1960 | Youmans ................... 250/265 |
| 4,618,765 | A | * | 10/1986 | Sonne ..................... 250/269.3 |
| 4,638,159 | A | * | 1/1987 | Nunley ..................... 250/267 |
| 5,508,514 | A | | 4/1996 | Sallwasser et al. |
| 6,308,561 | B1 | | 10/2001 | Samworth et al. |
| 6,619,395 | B2 | | 9/2003 | Spross |
| 6,738,720 | B2 | | 5/2004 | Odom et al. |
| 6,872,937 | B2 | | 3/2005 | Williams et al. |

* cited by examiner

*Primary Examiner*—Constantine Hannaher
(74) *Attorney, Agent, or Firm*—Cantor Colburn LLP

(57) ABSTRACT

A method for measuring radiation in a borehole, the method including placing a detector comprising a scintillator and a plurality of photodetectors in the borehole; detecting a radiation interaction with a first photodetector; detecting the radiation interaction with at least a second photodetector; and determining a location of the interaction from the detecting; wherein the location provides information regarding formations surrounding the borehole.

17 Claims, 9 Drawing Sheets

HIGH RESOLUTION GAMMA MEASUREMENTS AND IMAGING

BACKGROUND OF THE INVENTION

1. Field of the Invention

This invention relates to measuring gamma radiation emitted from a subsurface formation. In particular, the measuring is performed within a borehole.

2. Description of the Related Art

A variety of geologic formations contain reservoirs of oil and gas. Measuring properties of the geologic formations provides information that can be useful for locating the reservoirs of oil and gas. Typically, the oil and gas are accessed by drilling boreholes into the subsurface of the earth. The boreholes also provide access to take measurements of the geologic formations.

Well logging is a technique used to take measurements of properties of the geologic formations from the boreholes. In one embodiment, a logging instrument is disposed in a drill string in proximity to a drill bit. The logging instrument is used to take the measurements and send data via telemetry to the surface for recording. This type of well logging is referred to as "logging while drilling" (LWD). One type of LWD measurement involves measuring naturally occurring gamma radiation (or gamma rays) from the geologic formations.

The geologic formations may include regular features (bedding planes and formation contacts) and irregular features (faults, nodules and changes in cementation). In a quest for oil and gas, it is important to know about the location and composition of these regular and irregular features. In particular, it is important to know about the bedding planes with a high degree of accuracy so that drilling resources are not wasted.

Measuring naturally occurring gamma radiation is one way to determine characteristics of the bedding planes. For example, a gamma radiation detector may be used as a component of the logging instrument to measure the naturally occurring radiation in the borehole. In some embodiments, scintillator materials are used for gamma radiation detection.

Radiation detectors using scintillation materials are usually optically coupled to a devise such as photomultiplier tube (PMT). Interaction of radiation within the scintillator causes emission of at least a photon by the scintillator. Subsequently, the photon is detected in the PMT and accounted for by appropriate electronics. Gamma rays may enter the gamma radiation detector from any angle. As long as a gamma ray interacts within the gamma radiation detector, the gamma radiation detector will output an electrical signal regardless of the angle of entry. As the gamma radiation detector is moved along the borehole, gamma rays emitted from a rock formation (a bedding plane itself cannot emit gamma radiation, but the contrast between two formations or features is detectable by measuring gamma radiation) may enter the gamma radiation detector and be detected.

Various shapes and forms of gamma radiation detectors may provide various types of information about the bedding planes. A cylindrically shaped gamma radiation detector of a certain length provides opportunities for gamma rays to interact along the length as the gamma radiation detector moves by the formation bedding planes. On the other hand, if the gamma radiation detector was, hypothetically, only a point, there would be fewer opportunities for gamma rays to interact as the gamma radiation detector moves by the formation bedding planes. A gamma radiation detector that has a geometry that is equivalent to a point can detect changes in radiation as the detector is moved through the borehole with better spatial resolution than the cylindrically shaped gamma radiation detector. Cylindrically shaped gamma radiation detectors will have less spatial resolution and therefore will result in less accurate knowledge of the formation bedding planes.

What are needed are techniques for making measurements of gamma radiation from a subsurface formation where the techniques provide improved spatial resolution along an axis of the borehole.

BRIEF SUMMARY OF THE INVENTION

Disclosed is one example of a method for measuring radiation in a borehole, the method including placing a detector comprising a scintillator and a plurality of photodetectors in the borehole; detecting a radiation interaction with a first photodetector; detecting the radiation interaction with at least a second photodetector; and determining a location of the interaction from the detecting; wherein the location provides information regarding formations surrounding the borehole.

Also disclosed is one embodiment of an instrument for measuring radiation in a borehole, the instrument including a scintillator; a plurality of photodetectors coupled to the scintillator; and an electronics unit coupled to the plurality of photodetectors for determining a location in the scintillator where the radiation interacted; wherein the scintillator, the plurality of photodetectors and the electronics unit are disposed within a housing adapted for insertion into the borehole.

Further disclosed is one example of a method for producing an instrument for measuring radiation in a borehole, the method including selecting a scintillator; coupling a plurality of photodetectors to the scintillator; and disposing the scintillator and the plurality of photodetectors into a housing adapted for insertion into the borehole.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

The teachings provide techniques for malting measurements of gamma radiation emitted from a formation. The measurements are performed in a borehole and provide improved spatial resolution. In general, the measurements are performed using a scintillator and at least two photodetectors. Generally, each photodetector is disposed on a side of the scintillator. A gamma ray (or gamma particle) that interacts within the scintillator will generate a photon that can propagate to one of the photodetectors and be detected. The photodetector will provide an output signal related to the number and energy of photons detected. The location where the gamma ray interacted in the scintillator can be determined by knowing information such as the attenuation constant of the scintillator and measuring the output signal of each photodetector. Determining the location provides the improved spatial resolution.

Figure 1:
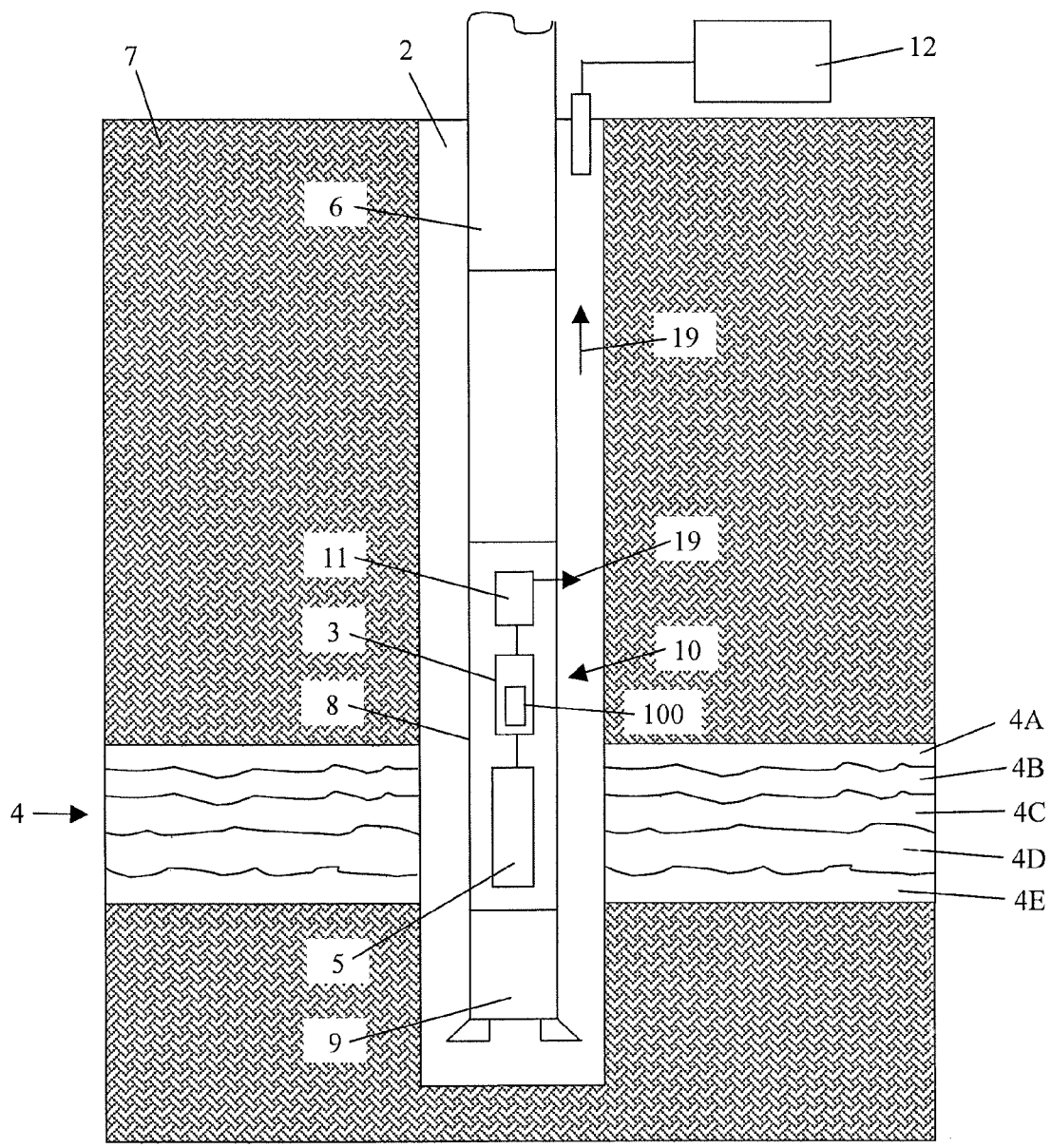
FIG. 1 illustrates an exemplary embodiment of a logging instrument in a borehole penetrating the earth.

Referring to FIG. 1, an exemplary embodiment of a well logging instrument 10 is shown disposed in a borehole 2. The borehole 2 is drilled through earth 7 and penetrates formations 4, which include various formation bedding planes 4A-4E. The logging instrument 10 is shown disposed in a drill string 6 in proximity to a drill bit 9. The logging instrument 10 includes a gamma radiation detector 5, an electronics unit 3, and telemetry 11 disposed within a housing 8. The housing 8 is adapted for use in the borehole 2. The gamma radiation detector 5 is coupled to the electronics unit 3. The electronics unit 3 is used for operation of the gamma radiation detector 5. The telemetry 11 sends a telemetry signal 19 to the surface of the earth 7. The telemetry signal 19 includes information related to gamma radiation measured by the gamma radiation detector 5. At the surface of the earth 7, the telemetry signal 19 is received by a surface processor unit 12. The surface processor unit 12 can at least one of display, record, process, and transmit the telemetry signal 19. In one embodiment, the surface processor unit 12 transmits the telemetry signal 19 via the Internet to a remote location. FIG. 1 also shows a computer 100 disposed within the electronics unit 3. The computer 100 is discussed in detail further on with respect to FIG. 5.

In typical embodiments, the borehole 2 includes materials such as would be found in oil exploration, including a mixture of fluids such as water, drilling fluid, mud, oil and formation fluids that are indigenous to the various formations. One skilled in the art will recognize that the various features and materials as may be encountered in a subsurface environment may be referred to as "formations." Accordingly, it should be considered that while the term "formation" generally refers to geologic formations of interest, that the term "formations," as used herein, may, in some instances, include any geologic points of interest (such as a survey area).

Figure 2:
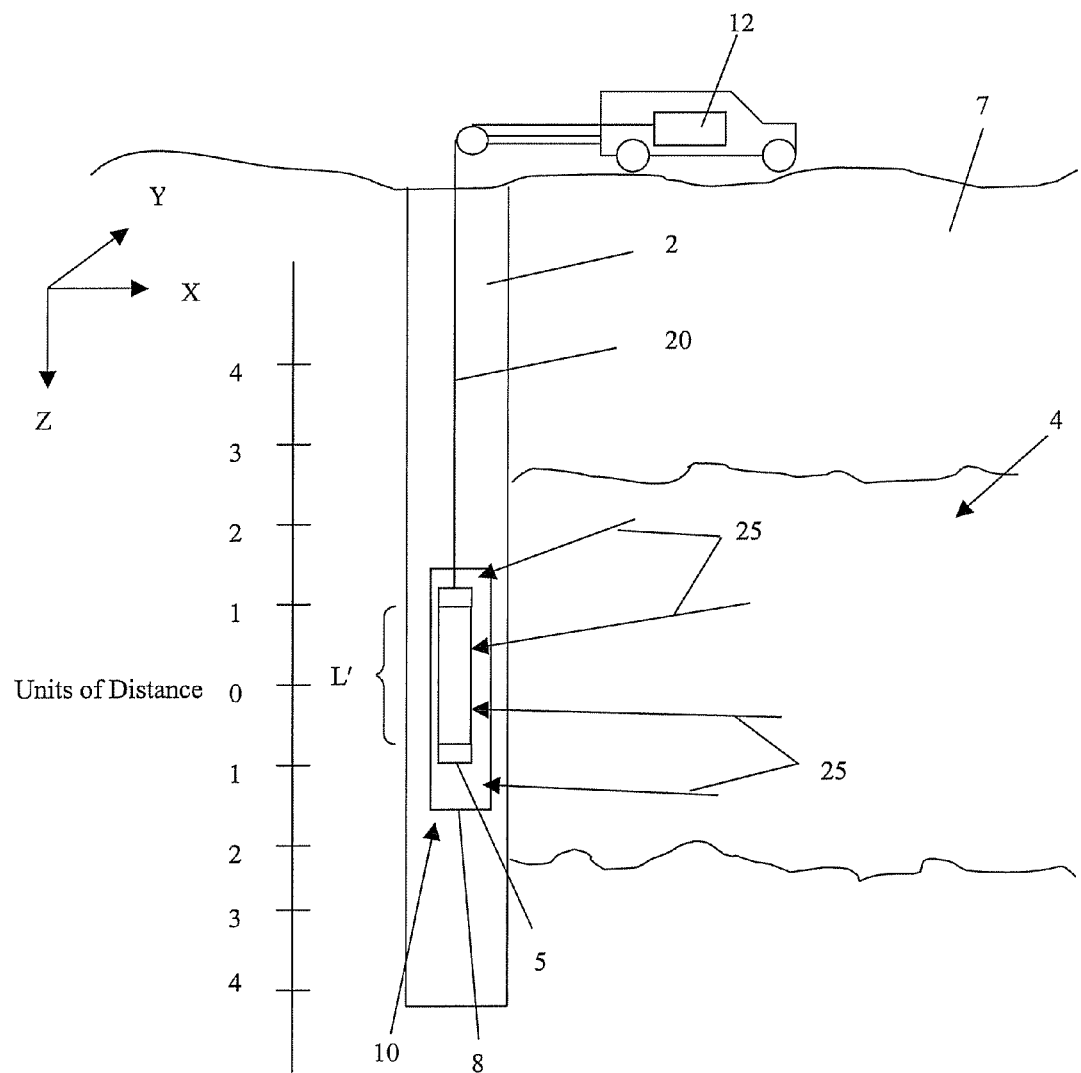
FIG. 2 illustrates a wireline embodiment of the logging instrument.

For convenience, certain definitions are provided. The term "spatial resolution" relates to an ability of a detector to resolve radiation along a length of the detector. Spatial resolution is generally associated with measurements as the detector is moved through the borehole 2. FIG. 2 illustrates a wireline embodiment of the logging instrument 10 supported by a wireline 20. The wireline 20 may also transmit information to the surface processor unit 12 at the surface of the earth 7. For illustration purposes, logging instrument 10 is depicted only with the gamma radiation detector 5 and the housing 8. Referring to FIG. 2, the gamma radiation detector 5 included in the logging instrument 10 has a given "spatial resolution" for detection of gamma rays 25 emitted from the formation 4.

As shown in FIG. 2, an axis of the borehole 2 is aligned in the Z-direction. Parameters that affect spatial resolution of the detector 5 include a scintillator length, L', a speed at which the logging instrument 10 traverses the borehole 2, counting efficiency, volume of the scintillator, scintillator type, voltage, and others as may be known in the art. The spatial resolution of the gamma radiation detector 5 relates to the degree to which the gamma radiation detector 5 can resolve changes in gamma radiation as the gamma radiation detector 5 traverses the borehole 2.

The term "collimator" relates to a device that filters a stream of rays, such as gamma rays, so that only those traveling parallel to a specified direction are allowed through the device.

For the purposes of this discussion, it is assumed that the borehole 2 is vertical and that the formations 4 are horizontal. Thus the spatial resolution along the borehole may be referred to as "vertical resolution." It is recognized that the spatial resolution is not limited to the Z-direction but may include X and/or Y components. The apparatus and method however can be applied equally well in deviated or horizontal wells or with the formation bedding planes 4A-4E at any arbitrary angle. The apparatus and method are equally suited for use in measurement while drilling (MWD) applications and in open-borehole and cased-borehole wireline applications. Additionally, the logging instrument 10 and method can be applied to total gamma radiation measurements and to measurements of gamma ray energy spectra. Generally, measuring gamma radiation includes measuring at least one of energy of gamma rays and counts generated by the gamma radiation detector 5. The energy and associated counts may be plotted to provide the gamma ray energy spectra.

Figure 3:
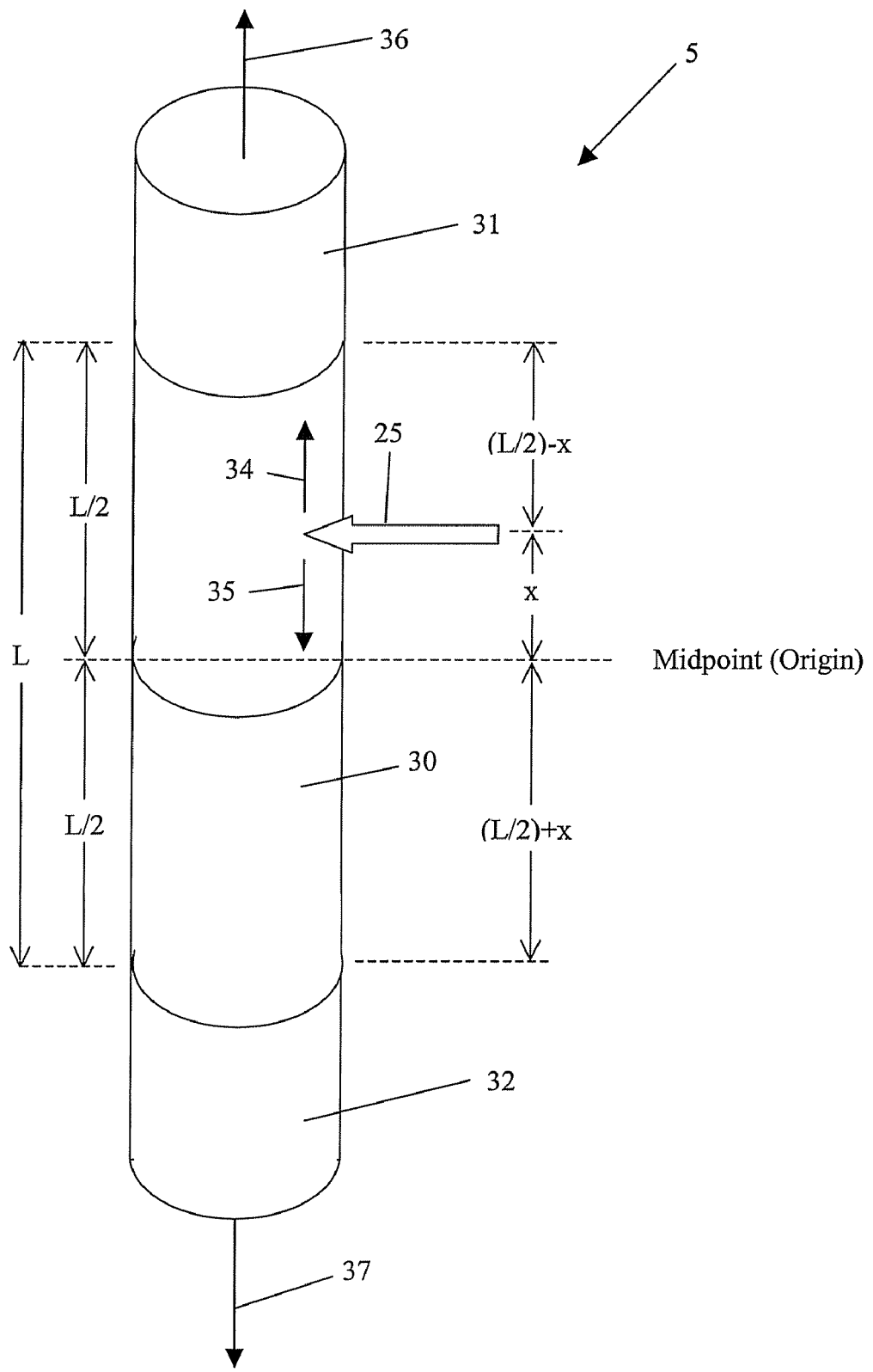
FIG. 3 illustrates a gamma radiation detector with two photodetectors.

FIG. 3 illustrates an exemplary embodiment of the gamma radiation detector 5. Referring to FIG. 3, the gamma radiation detector 5 includes a scintillator 30 of length "L," a first photodetector 31 and a second photodetector 32. In the embodiment of FIG. 3, the length L is also the distance between the first photodetector 31 and the second photodetector 32. Exemplary embodiments of the scintillator 30 include inorganic crystals such as thallium doped sodium iodide (NaI(Tl)), thallium doped cesium iodide (CsI(Tl)), and bismuth germinate (BGO) and organic plastics such as polyvinyl toluene (PVT). Other materials as are known to those skilled in the art of gamma radiation detection may be used. Each of the photodetectors 31 and 32 provides an output signal with amplitude related to the intensity of the photon flux entering each photodetector. Exemplary embodiments of the photodetector include photomultiplier tubes and solid-state devices such as photodiodes.

The scintillator 30 has an associated light attenuation coefficient "μ." The light attenuation coefficient μ, the reciprocal of the scintillator attenuation length, relates a decrease in intensity of a photon flux traveling in the scintillator 30 to the distance traveled in the scintillator 30. Equation (1) relates the intensity "I" of the photon flux to the distance "d" traveled in the scintillator 30:

$$I = I_0 e^{-\mu d} \quad (1)$$

where $I_0$ is the initial intensity of the photon flux with no attenuation.

Referring to FIG. 3, one gamma ray 25 interacts within the scintillator 30 and generates a photon flux 34 and a photon flux 35. The photon flux 34 interacting with the first photodetector 31 causes the photodetector 31 to generate an output signal 36 with amplitude $S_1$. The amplitude $S_1$ is related to the intensity, $I_1$, of the photon flux 34 after attenuation in the scintillator 30. Similarly, the photon flux 35 interacting with the photodetector 32 causes the photodetector 32 to generate an output signal 37 with amplitude $S_2$. The amplitude $S_2$ is related to intensity, $I_2$, of the photon flux 35 after attenuation in the scintillator 30.

The point of interaction of the gamma ray 25 in the scintillator 30 may be determined from $S_1$, $S_2$, and μ and of the scintillator 30. Referring to FIG. 3 and choosing the midpoint of the scintillator 30 as the origin of the measurement coordinate system, the point of interaction of the gamma ray 25 with the scintillator 30 is designated as a distance x from the origin. Therefore, the distance the photon flux 34 travels to the photodetector 31 is "(L/2)−x." The distance the photon flux 35 travels to the photodetector 32 is "(L/2)+x." Equation (2) represents the amplitude $S_1$ of the output signal 36 in terms of the variables defined above and where $S_1$ is directly proportional to the intensity of the photon flux 34 interacting within the photodetector 31:

$$S_1 = I_0 e^{-\mu((L/2)-x)} \quad (2).$$

Equation (3) represents the amplitude $S_2$ of the output signal 37 in terms of the variables defined above and where $S_2$ is directly proportional to the intensity of the photon flux 35 interacting within the photodetector 32:

$$S_2 = I_0 e^{-\mu((L/2)+x)} \quad (3).$$

The ratio of $I_1$ to $I_2$ may be calculated as shown in Equation (4):

$$S_1/S_2 = I_0 e^{-\mu((L/2)-x)} / I_0 e^{-\mu((L/2)+x)} = e^{2\mu x} \quad (4).$$

The natural logarithm (base e) of the ratio $S_1$ to $S_2$ may be calculated as shown in Equation (5):

$$\ln(S_1/S_2) = 2\mu x \quad (5).$$

The distance x may be solved for as shown in Equation (5):

$$x = (1/(2\mu)) \ln(S_1/S_2) \quad (6).$$

Implementation of the above mathematical technique may be performed in one of the electronics unit 11 and the surface processor 12 as shown in FIG. 1. In some other embodiments, the mathematical technique may be performed at a remote location. The electronics unit 11 is coupled to the photodetector 31 and the photodetector 32 for processing the output signal 36 and the output signal 37. In one embodiment, the electronics unit 11 processes the signals to determine the distance x.

Other embodiments of the gamma radiation detector 5 using the scintillator 30 and two or more photodetectors are possible. As examples, embodiments of the scintillator 30 may include various shapes to improve spatial resolution. Embodiments of the gamma radiation detector 5 may include photodetectors of various geometries to improve spatial resolution. In another embodiment of the gamma radiation detector 5, more than one scintillator 30 is used. In embodiments with more than one scintillator 30, one scintillator 30 may be disposed within another scintillator 30.

Figure 4:
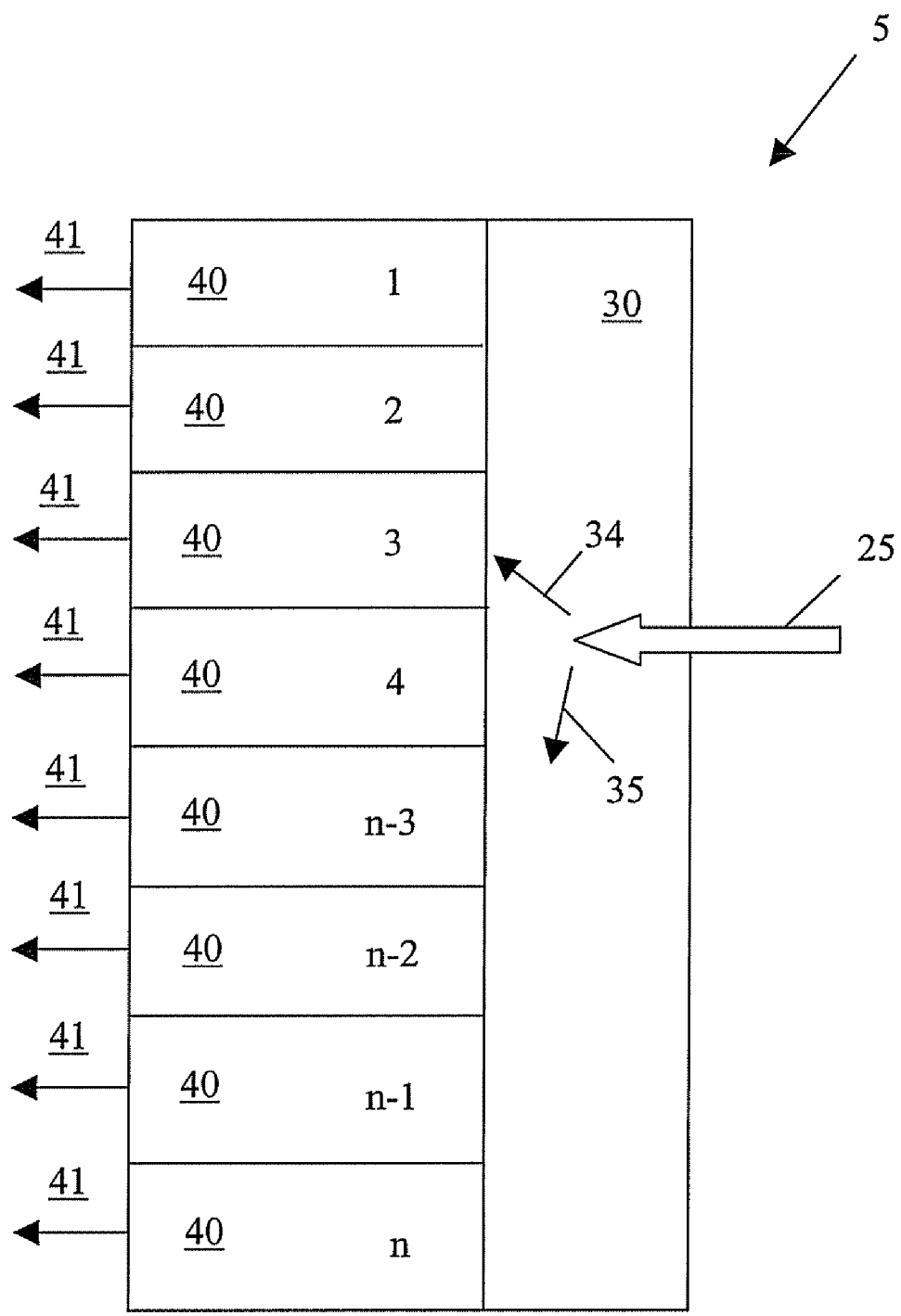
FIG. 4 illustrates a gamma radiation detector with a plurality of photodetectors.

FIG. 4 illustrates an exemplary embodiment of the gamma radiation detector 5 with a plurality of photodetectors 40. Referring to FIG. 4, the plurality of photodetectors 40 includes "n" photodetectors 40. Each photodetector 40 includes an output signal 41 of amplitude $S_n$. The element number 40 is used to illustrate that more than two photodetectors may be used in the gamma radiation detector 5. The photodetectors 40 may be similar to one of the photodetector 31 and the photodetector 32. In the embodiment of FIG. 4, the amplitude $S_n$ of each output signal 41 can be used to determine a location where the gamma ray 25 interacted within the scintillator 30. The amplitude $S_n$ is related to the intensity $I_n$ of the photon flux interacting within the "n-th" photodetector 40. In one embodiment, the photodetector 40 that is closest to the location of interaction will detect a photon flux with intensity $I_n$ that is higher than the intensity of the photon flux interacting within the other photodetectors 40. In addition, the mathematical techniques described above may be used to further refine determining the location. FIG. 4 also illustrates an example of a collimator 45 disposed adjacent to the scintillator 30 and shielding 46 disposed in proximity to at least one photodetector in the plurality of photodetectors.

The logging instrument 10 may include a string of two or more gamma radiation detectors 5. The string of gamma radiation detectors 5 provides a broad sensitivity area for gamma radiation detection in the borehole 2 while maintaining improved spatial resolution.

In certain embodiments, a string of two or more logging instruments 10 may be used where each logging instrument 10 includes at least one gamma radiation detector 5. In these embodiments the responses from the gamma radiation detectors 5 may be combined to produce a composite response exhibiting a spatial resolution similar to the spatial resolution of a single gamma radiation detector 5.

In another embodiment of the logging instrument 10, the location of interaction of the beam of gamma rays 25 may be registered in an electronic "bin." Several bins may be used to represent the length of the scintillator 30. For example, twenty bins may be used to represent each centimeter (cm) of a scintillator 30 that is twenty centimeters long. The spatial resolution of this embodiment is to within about one centimeter. In this embodiment, each electronic bin may serve as a "virtual gamma radiation detector." Counts entered into one electronic bin can be considered as counts detected by one virtual gamma radiation detector.

The well logging instrument 10 may include adaptations as may be necessary to provide for operation during drilling or after a drilling process has been completed.

Figure 5:
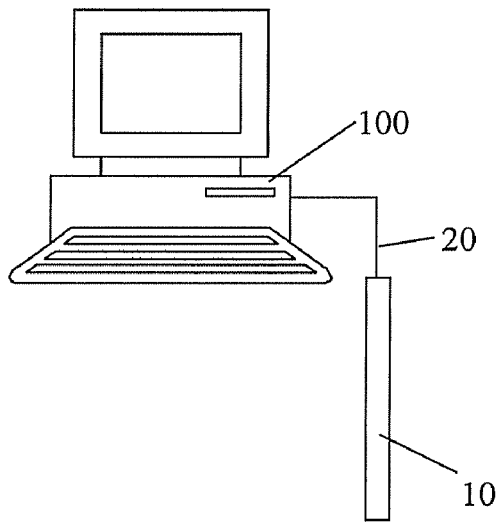
FIG. 5 illustrates an exemplary embodiment of a computer coupled to the logging instrument.

Referring to FIG. 5, an exemplary apparatus for implementing the teachings herein is depicted. In FIG. 5, the apparatus includes a computer 100 coupled to the well logging instrument 10. In one embodiment, the computer 100 is included in the electronics unit 11. Typically, the computer 100 includes components as necessary to provide for real time processing of data from the well logging instrument 10. Exemplary components include, without limitation, at least one processor, storage, memory, input devices, output devices and the like. As these components are known to those skilled in the art, these are not depicted in any detail herein.

The teachings herein may include an algorithm that is stored on machine-readable media. The algorithm is implemented by the computer 100 and provides operators with desired output. The output may be generated on a real-time basis.

As used herein, generation of data in "real-time" is taken to mean generation of data at a rate that is useful or adequate for making decisions during or concurrent with processes such as production, experimentation, verification, and other types of surveys or uses as may be opted for by a user or operator. As a non-limiting example, real-time measurements and calculations may provide users with information necessary to make desired adjustments during the drilling process. In one embodiment, adjustments are enabled on a continuous basis (at the rate of drilling), while in another embodiment, adjustments may require periodic cessation of drilling for assessment of data. Accordingly, it should be recognized that "real-time" is to be taken in context, and does not necessarily indicate the instantaneous determination of data, or make any other suggestions about the temporal frequency of data collection and determination.

A high degree of quality control over the data may be realized during implementation of the teachings herein. For example, quality control may be achieved through known techniques of iterative processing and data comparison. Accordingly, it is contemplated that additional correction factors and other aspects for real-time processing may be used. Advantageously, the user may apply a desired quality control tolerance to the data, and thus draw a balance between rapidity of determination of the data and a degree of quality in the data.

Figure 6:
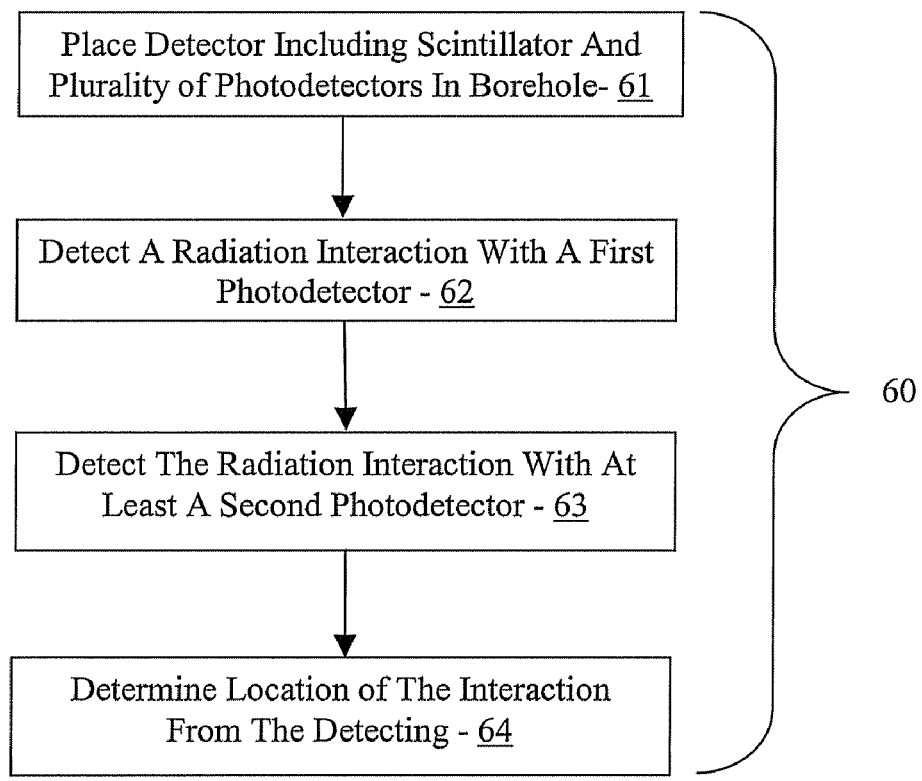
FIG. 6 presents an exemplary method for measuring gamma radiation in the borehole.

FIG. 6 presents an exemplary method 60 for measuring gamma radiation in a borehole. The method 60 includes placing 61 the gamma radiation detector 5 that includes the scintillator 30 and a plurality of photodetectors 40 in the borehole 2. Further, the method 60 includes detecting 62 a radiation interaction with a first photodetector 40. Further, the method 60 includes detecting 63 the radiation interaction with at least a second photodetector 40. Further, the method 60 includes determining 64 a location of the interaction from the detecting.

Figure 7:
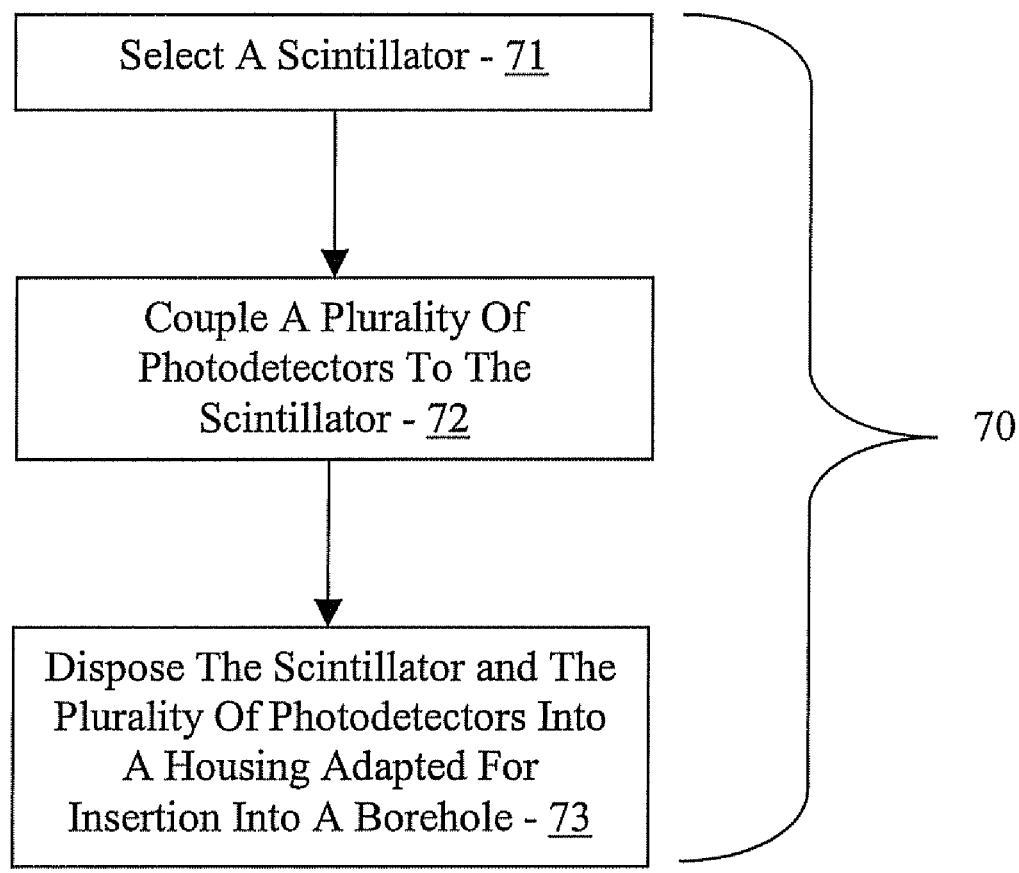
FIG. 7 presents an exemplary method for producing the logging instrument.
Figure 8:
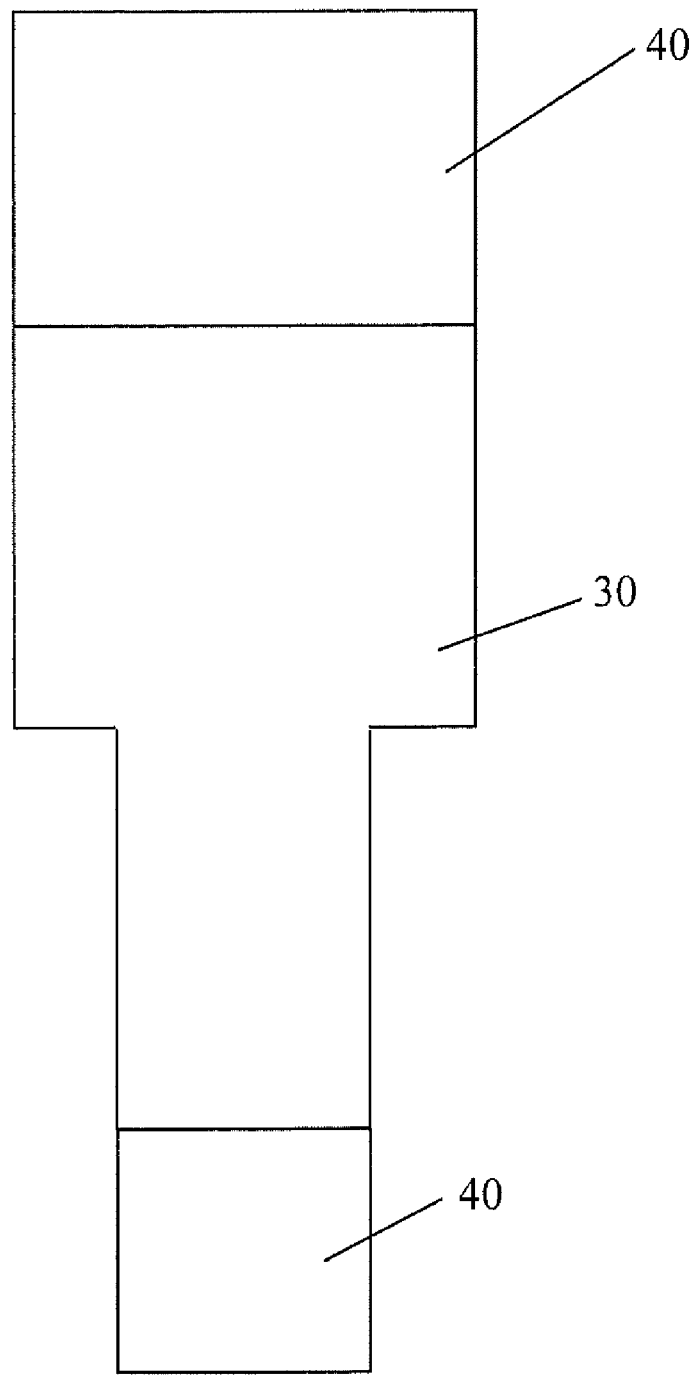
FIG. 8 illustrates an exemplary embodiment of one photodetector in the plurality of photodetectors having a geometry different from another photodetector.
Figure 9:
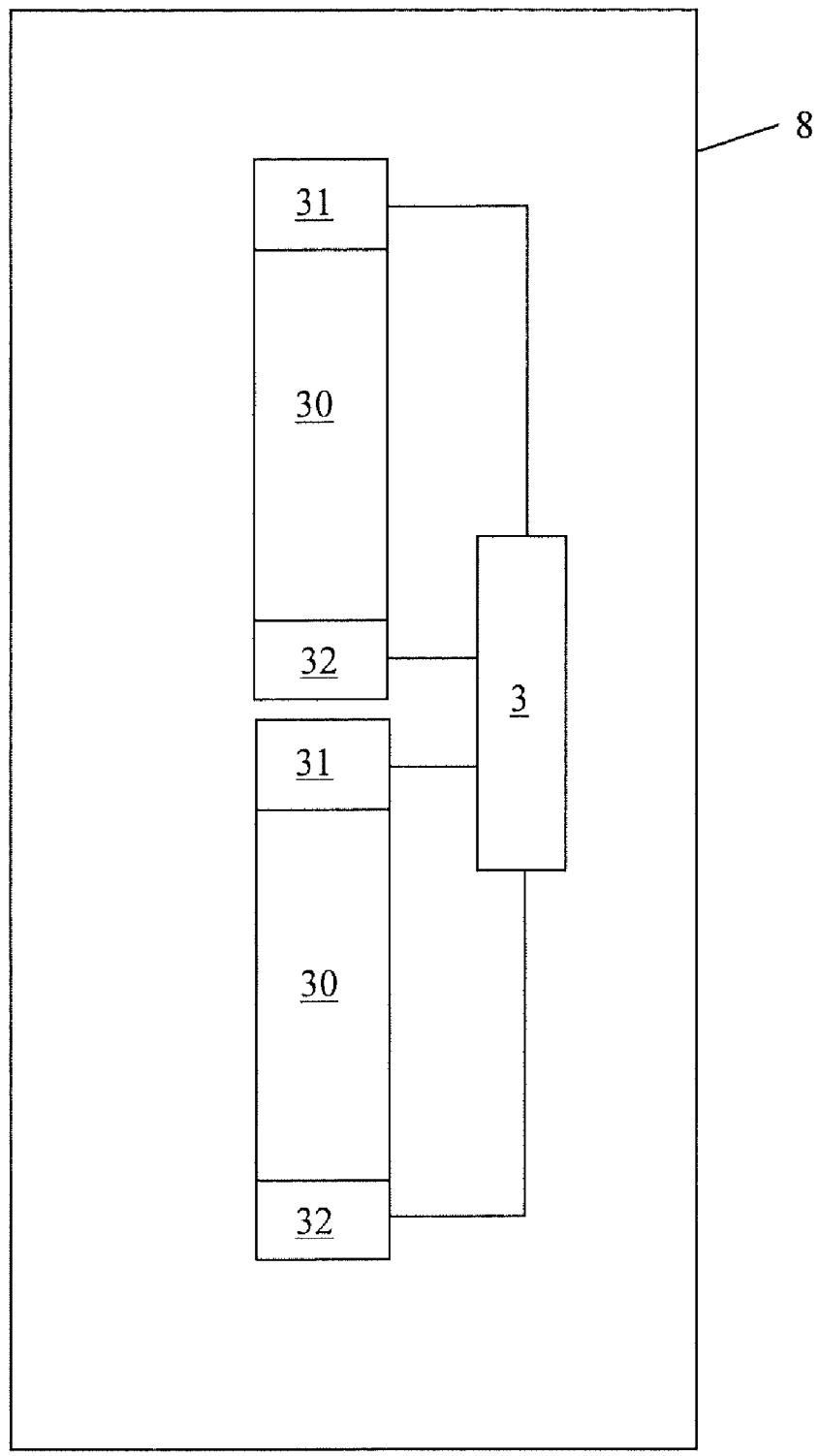
FIG. 9 illustrates an exemplary embodiment of the instrument having another scintillator coupled to another plurality of photodetectors.
Figure 10:
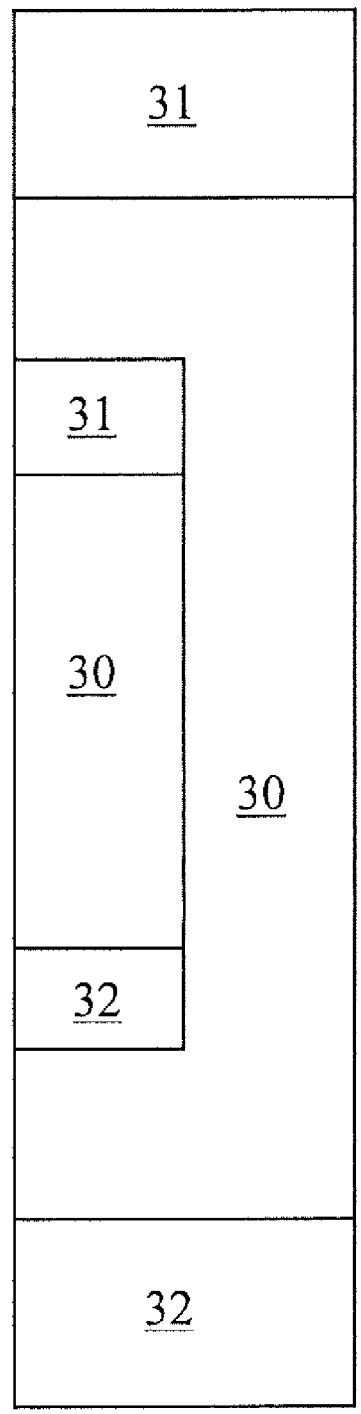
FIG. 10 illustrates an exemplary embodiment of a scintillator disposed within another scintillator.

FIG. 7 presents an exemplary method 70 for producing the logging instrument 10. The method 70 calls for selecting 71 the scintillator 30. Further, the method 70 calls for coupling 72 the plurality of photodetectors 40 to the scintillator 30. Further, the method 70 calls for disposing 73 the scintillator 30 and the plurality of photodetectors 40 into the housing 8. FIGS. 8, 9 and 10 depict various embodiments of the techniques disclosed herein. FIG. 8 illustrates an exemplary embodiment of one photodetector 40 in the plurality of photodetectors 40 having a geometry different from another photodetector. FIG. 9 illustrates an exemplary embodiment of the instrument 10 having another scintillator coupled to another plurality of photodetectors. And, FIG. 10 illustrates an exemplary embodiment of a scintillator disposed within another scintillator.

In support of the teachings herein, various analysis components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply, cooling unit, heating component, sensor, electrode, transmitter, receiver, transceiver, controller, optical unit, electrical unit, electromechanical unit, or shielding (all of which may be remote or local to the instrument 10) may be included in support of the various aspects discussed herein or in support of other functions beyond this disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for measuring radiation in a borehole, the method comprising:

placing a detector comprising a scintillator and a plurality of photodetectors disposed adjacent to the scintillator in the borehole;

detecting a radiation interaction in the scintillator with at least a first photodetector in the plurality; and determining a location of the interaction from a photodetector in the plurality having a highest amplitude output signal;

wherein the location provides information regarding formations surrounding the borehole.

2. The method as in claim 1, further comprising detecting the radiation interaction with a second photodetector in the plurality and determining a distance between the first photodetector and the second photodetector at which the interaction occurred wherein the determining a distance comprises solving the equation:

$$x=(1/(2\mu))\ln(S_1/S_2)$$

where x represents a distance from a midpoint of the scintillator between the first photodetector and the second photodetector, $\mu$ represents an attenuation coefficient of the scintillator, $S_1$ represents an amplitude of a signal from the first photodetector, and $S_2$ represents an amplitude of a signal from the second photodetector.

3. The method as in claim 1, further comprising registering the location in a bin representing a portion of the scintillator.

4. The method as in claim 1, further comprising measuring at least one of energy and counts of gamma radiation.

5. The method as in claim 4, further comprising determining an energy spectra of the gamma radiation.

6. The method as in claim 1, wherein the method is implemented by a computer program product stored on machine readable media comprising machine executable instructions.

7. An apparatus for measuring radiation in a borehole, the instrument comprising:

a logging instrument;

a scintillator disposed at the logging instrument;

a plurality of photodetectors coupled to the scintillator; and a processor coupled to the plurality of photodetectors for determining a location in the scintillator where the radiation interacted by implementing a method comprising:

detecting a radiation interaction in the scintillator with at least a first photodetector in the plurality; and determining a location of the interaction from a photodetector in the plurality having a highest amplitude output signal.

8. The apparatus as in claim 7, wherein the plurality comprises a first photodetector and a second photodetector.

9. The apparatus as in claim 7, wherein the scintillator comprises at least one of an inorganic crystal and an organic plastic.

10. The apparatus as in claim 7, wherein the plurality of photodetectors comprise at least one of a solid-state device and a photomultiplier tube.

11. The apparatus as in claim 7, further comprising shielding in proximity to at least one photodetector in the plurality of photodetectors.

12. The apparatus as in claim 7, wherein the electronics unit comprises at least one of a processor and storage media.

13. The apparatus as in claim 7, wherein at least one photodetector in the plurality of photodetectors comprises a geometry different from the geometry of the other photodetectors.

14. The apparatus as in claim 7, further comprising another scintillator coupled to another plurality of photodetectors wherein the another plurality of photodetectors is coupled to the electronics unit for determining a location in the another scintillator where the radiation interacted, the another scintillator and the another plurality of photodetectors being disposed within the housing.

15. The apparatus as in claim 14, wherein the another scintillator is disposed within the scintillator.

16. The apparatus as in claim 7, further comprising a collimator disposed adjacent to the scintillator.

17. A method for producing an instrument for measuring radiation in a borehole, the method comprising:

selecting a scintillator;

coupling a plurality of photodetectors to the scintillator;

coupling a processor to the plurality of photodetectors wherein the processor implements a method comprising:

detecting a radiation interaction in the scintillator with at least a first photodetector in the plurality; and determining a location of the interaction from a photodetector in the plurality having a highest amplitude output signal;

disposing the scintillator and the plurality of photodetectors into a housing adapted for insertion into the borehole.

* * * * *